April 19, 1938. M. PAOLINI ET AL 2,114,569

POWER DRIVEN KNIFE

Filed Feb. 10, 1934  2 Sheets-Sheet 1

Inventor.
M. Paolini
F. Perco

By Marks & Clerk
Attorneys.

April 19, 1938. M. PAOLINI ET AL 2,114,569
POWER DRIVEN KNIFE
Filed Feb. 10, 1934 2 Sheets-Sheet 2

M. Paolini & F. Perco
Inventors
By: Glascock Downing Seebold
Attys.

Patented Apr. 19, 1938

2,114,569

UNITED STATES PATENT OFFICE 2,114,569

POWER DRIVEN KNIFE

Mario Paolini and Francesco Perco, Trieste, Italy

Application February 10, 1934, Serial No. 710,694
In Italy February 23, 1933

4 Claims. (Cl. 30—272)

This invention relates to a hand-manipulated power-driven slicing implement of the type comprising one or more longitudinally reciprocated cutting elements, and has for its object to provide an efficient, reliable, and convenient implement of this nature, more particularly for use by grocers and purveyors of foodstuffs for use in slicing meat and other piece goods. A further object of the invention is to provide compensating means capable of effectually preventing the transmission to the handle of the implement of any vibration due to the mass effect of the reciprocating parts even when the latter are driven at a very high speed. This feature is of paramount importance in slicing implements for use by retailers, since the implement is liable to be in continuous use for long periods of time, and if any appreciable vibration is set up the handling of the implement soon becomes intolerable. Further objects of the invention will become apparent in the course of the ensuing description.

The slicing implement according to the present invention comprises in combination a support for a cutting element which is provided with a handle to be gripped like an ordinary knife, sliding guides having preferably the same longitudinal direction as that of the handle and carried by the said support, at least one cutting element adapted to be longitudinally reciprocated in said guides, driving means and transmission mechanism actuated by such driving means and adapted to impart reciprocating motion to the cutting element or elements. The implement in accordance with the invention is gripped by the handle like an ordinary knife and, while the mechanical device imparts to the cutting element or elements the reciprocating motion, these elements are pressed, by means of the handle, through the material to be sliced in a direction approximately at right angles to the cutting edge of the cutting elements.

The device according to the present invention also embodies the provision of balancing means adapted to prevent the reciprocating motion of the movable elements, (i. e. cutting elements, sliding shoes of the guides, etc.), from imparting to the whole device vibrations due to the reversal of the motion of said elements. In a preferred embodiment the balancing means consist of balancing masses corresponding to that of the aforesaid reciprocating elements and to which there is imparted a reciprocating motion opposite to that of the said elements.

The device according to the invention is also characterized by the further combination of the above mentioned parts with means carried by the said support and adjustable thereon in such a manner as to be variable in clearance from the sharp edge of the cutting element, such means being destined to be placed in contact with the material to be sliced and adjusted as to distance from the sharp edge of the cutting element with the result that the thickness of the slice cut can be varied at will.

Further features will become apparent in the course of the following specification and the accompanying claims.

The annexed drawings illustrate, only by way of example, an embodiment of the present invention, and in these drawings.

Figure 1:
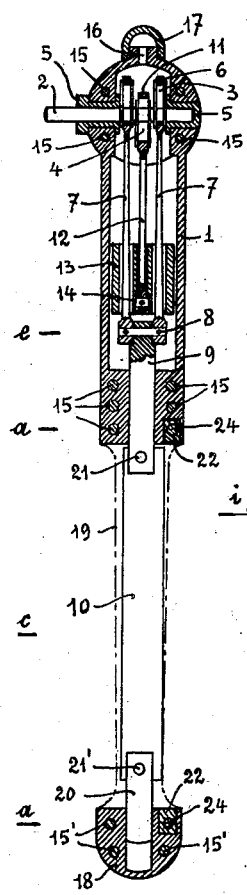
Fig. 1 is a partial longitudinal section (on the line g—h of Fig. 6)
Figure 2:
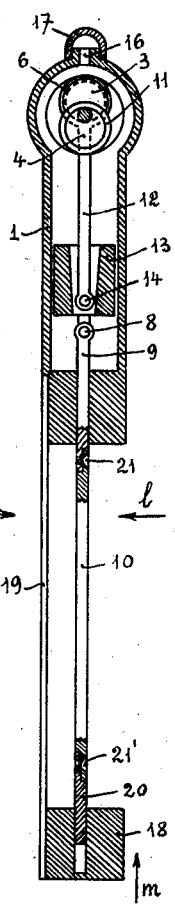
Fig. 2 is a partial longitudinal section taken on the line x—y of Fig. 5.
Figure 3:
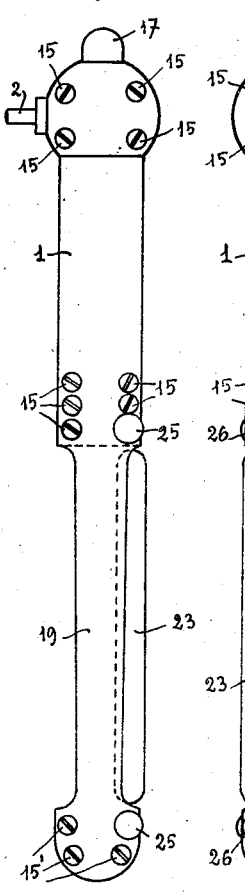
Fig. 3 is a side view as seen in the direction of the arrow i of Fig. 2.
Figure 4:
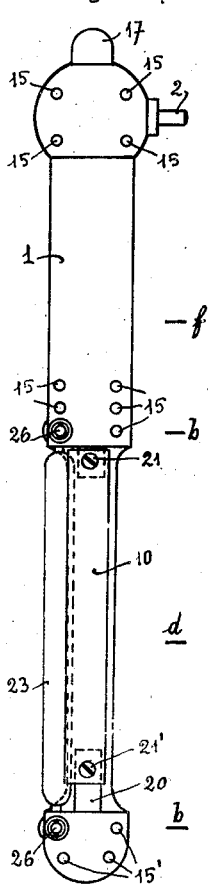
Fig. 4 is a side view as seen in the direction of the arrow l of Fig. 2.
Figure 5:
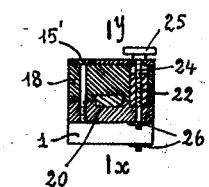
Figure 6:
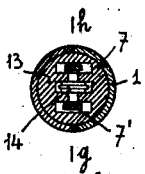
Figures 7, 8:
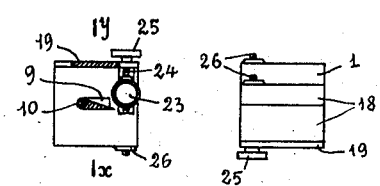

Figs. 5, 6, and 7 show transverse sections taken on the lines a—b, e—f and c—d of Figs. 1 to 4 respectively;

Fig. 8 is an end view as seen in the direction of the arrow m of Fig. 2.

Figures 9, 10:
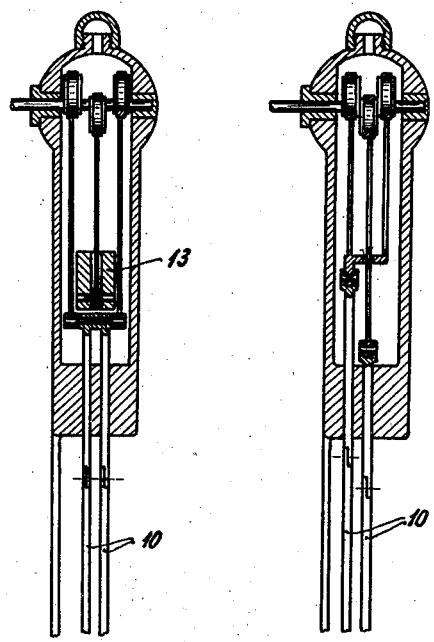

Figs. 9 and 10 show modifications.

The device comprises a handle 1 containing the mechanical means for imparting reciprocating motion to the element 10 which takes the form of a cutting blade; within the handle are located the shaft 2 revolving on the bearings 5 and carrying the two similar side eccentrics 3, and the intermediate eccentric 4; the eccentricities of the two eccentrics 3 are displaced 180° to that of the intermediate eccentric 4. The eccentrics 3 are encircled by the collars 6 which, by means of the connecting rods 7 and the journal 8, impart to the support 9 and therefore the knife 10, (which is fastened to the support 9 by means of the screw 21), a reciprocating movement the length of which is equal to twice the eccentricity of the eccentrics 3; the intermediate eccentric 4, on the other hand, by means of the collar 11, the connecting rod 12 and the journal 14 imparts to the balancing mass 13 a reciprocating movement the length of which is equal to twice the eccentricity of the eccentric 4. Owing to the arrangement of the eccentricities of the eccentrics 3 and 4, the mass 13 carries out at every moment a movement that is opposite to that of the support 9, the knife 10 and the other members (mentioned later on) connected to the knife and set in reciprocating motion. It is thus obvious that by suitably proportioning the mass 13 (according to known laws) it is possible to secure at any instant the balance of the dynamical actions of the other masses moving with a reciprocating motion thereby avoiding any vibration in the entire device.

In the exemplified embodiment, the handle 1 consists of two nearly symmetrical parts held together by the screws 15; the hole 16, fitted with the cap 17, serves for the introduction of lubricant. The frame head 18 is fastened by means of the screws 15' to the frame arm 19 which is of flat section material with rectangular (or like) section and which is in its turn fastened to the handle 1 by means of the said screws 15. In a longitudinal slot located in the frame head 18 there slides the forward support 20 to which the forward end of the cutting blade 10 is fastened by means of the screws 21'.

Using the parts described above with particular reference to Figs. 1 and 2 it is possible to obtain a simplified form of the device according to the present invention. The device thus constituted does not, however, enable an exact thickness of slice to be obtained with certainty. In order to attain also this further advantage, the device of the present invention can also include suitable adjusting means (see, in particular, Figs. 3 and 4).

Within the frame head 18 and the end of the handle 1 facing it, there are located adjustable bearings 22 in which are pivotally mounted the end journals of a roller 23 which, during the slicing operation, is placed and caused to roll upon the flat surface that the previous cut has left on the material sliced. The position of such roller 23 guiding the blade 10, (and therefore, its distance from the sharp edge of the knife 10), can be varied (increased or diminished) by turning the heads 25 of the adjusting screws 24 provided with end plates 26 bearing against the frame head 18 and the end of the handle 1.

The device is actuated by any suitable driving means which may be electrical, electromagnetic, pneumatic, hydraulic, etc., adapted to set in rotation the shaft 2, or also by a flexible transmitting shaft operated in its turn by any suitable prime mover.

The rotation of the shaft 2 sets up a sequence of reciprocating movements of the knife 10, and a sequence of reciprocating movements of the balancing mass, the latter movements being opposite in direction to the former. After having adjusted the screw heads 25 for the desired thickness of the slices to be obtained, the knife is caused to slip into the material to be sliced, and the roller 23 is caused to bear against the flat surface left by the preceding cutting operation, so that a rapid and perfect cutting, with slices having constant thickness, will be secured, and this irrespectively of the skill of the operator.

Although for descriptive reasons the present invention has been described with reference to the practical embodiment illustrated in the accompanying drawings, many modifications may be made herein without departing from the spirit of the invention.

It is also of course possible to employ, instead of a single knife or cutting element, a plurality of such elements disposed parallel and in spaced relation to each other, for the purpose of enabling a plurality of slices to be cut simultaneously. In this case these cutting elements can be coupled to the middle eccentric, like the single knife in the form of construction described in detail above, so that they are moved in unison, or some of these elements can be coupled to the middle eccentric and others to the two outer eccentrics. With this latter arrangement it then becomes possible to dispense with the use of a separate balancing mass altogether, provided the masses of the two groups of cutting elements be equal and consequently capable of balancing each other and therefore of cancelling each other to eliminate vibration in accordance with the invention. The former of these two arrangements is shown by way of example in Fig. 9, and the second in Fig. 10, there being in the one case two knives 10 coupled for tandem operation to the two outer eccentrics and a balancing mass 13 coupled to the middle eccentric (or vice-versa), while in the other case one knife is coupled to the middle eccentric, and a second, balancing, knife is coupled to the two outer eccentrics.

Having now particularly described and ascertained the nature of the present invention and in what manner the same is to be performed, what we claim is:—

1. A hand-manipulated power-driven slicing implement comprising in combination a hollow handle, a support rigidly attached to the forward end of the said handle substantially in alignment therewith, a guide at each end of the said support, at least one cutting element mounted for reciprocal movement in the said guides, an adjustable gauge roller mounted on the said support parallel to the said cutting element, a compensating weight adapted to reciprocate substantially parallel and counter to the said cutting element, a driving shaft mounted in the said handle at right angles to the longitudinal middle axis thereof and adapted to be connected directly to an outside source of power, a set of eccentric transmission means mounted centrally on the said shaft and coupled to the said compensating weight, a two-part set of eccentric transmission means disposed on the said shaft symmetrically on both sides of the said first set, having its throw disposed at 180° relatively to that of the said first set, and coupled to the said cutting element.

2. In a slicing device, a tubular handle, a rotatable shaft journaled in one end of the tubular handle normal to the longitudinal axis of the handle, a cutting element slidably mounted in the other end of the tubular handle, a compensating weight slidable in the handle, both the cutting element and the compensating weight being slidable in paths parallel to the longitudinal axis of the tubular handle, an eccentric mechanism mounted on the intermediate part of the rotatable shaft and operatively connected with the compensating weight, and an eccentric mechanism mounted on each end part of the rotatable shaft and operatively connected with the cutting element, said eccentric mechanisms being relatively arranged on the rotatable shaft so that during the rotation of the shaft the two outer eccentric mechanisms operate in unison to reciprocate the cutting element and so that the intermediate eccentric mechanism operates to reciprocate the compensating weight oppositely to the reciprocation of the cutting element, the mass of the cutting element and its eccentric mechanism and the mass of the compensating weight and its eccentric mechanism each having its center of gravity movable along the longitudinal axis of the tubular handle.

3. In a slicing device, a tubular handle, a rotatable shaft journaled in one end of the tubular handle normal to the longitudinal axis of the handle, a pair of cutting elements slidably mounted in spaced relation in the other end of the tubular handle, both of said cutting elements being slidable in paths parallel to the longitudinal axis of the tubular handle, an eccentric mechanism mounted on each end part of the rotatable shaft and both of said eccentric mechanisms being operatively connected with one of said cutting elements, and a third eccentric mechanism mounted on an intermediate part of the rotatable shaft between said first two eccentric mechanisms, said third eccentric mechanism being operatively connected with the other cutting element, said eccentric mechanisms being relatively arranged on the rotatable shaft so that during the rotation of the shaft the two outer eccentric mechanisms operate in unison to reciprocate the cutting element connected with said outer eccentric mechanisms, and so that the intermediate eccentric mechanisms operate to reciprocate the cutting element connected therewith oppositely to the reciprocation of the other cutting element, whereby said cutting elements counterbalance each other during their opposite reciprocation, the mass of each reciprocating mechanism, including an eccentric mechanism and a cutting element, having its center of gravity movable along the longitudinal axis of the tubular handle.

4. In a slicing device, a tubular handle, a rotatable shaft journaled in one end of the tubular handle normal to the longitudinal axis of the handle, a cutting element slidably mounted in the other end of the tubular handle, a counterbalancing element slidably mounted in the tubular handle, both the cutting and counter-balancing elements being slidable in paths parallel to the longitudinal axis of the tubular handle, an eccentric mechanism mounted on the intermediate part of the rotatable shaft and operatively connected with the counter-balancing element, and an eccentric mechanism mounted on each end part of the rotatable shaft and operatively connected with the cutting element, said eccentric mechanisms being relatively arranged on the rotatable shaft so that during the rotation of the shaft the two outer mechanisms operate in unison to reciprocate the cutting element and so that the intermediate eccentric mechanism operates to reciprocate the counter-balancing element oppositely to the reciprocation of the cutting element, the mass of the cutting element and its eccentric mechanism and the mass of the counterbalancing element and its eccentric mechanism each having its center of gravity movable along the longitudinal axis of the tubular handle.

MARIO PAOLINI.
FRANCESCO PERCO.